TWO-WAY TELEVISION OVER TELEPHONE LINES
Filed Sept. 30, 1954
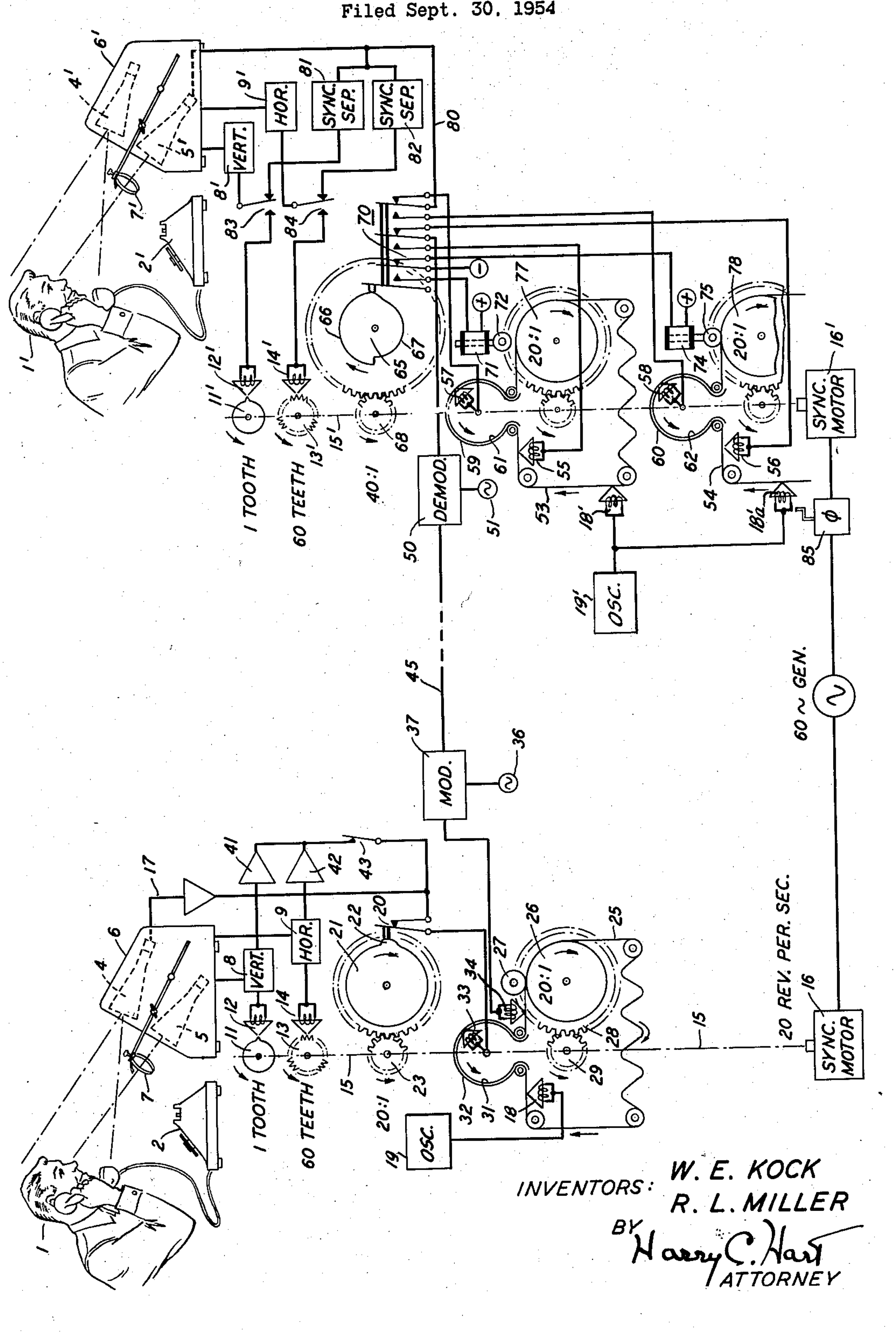
INVENTORS: W. E. KOCK
R. L. MILLER
BY Harry C. Hart
ATTORNEY United States Patent Office 2,895,005

Patented July 14, 1959

2,895,005

TWO-WAY TELEVISION OVER TELEPHONE LINES

Winston E. Kock, Basking Ridge, and Ralph L. Miller, Chatham, N.J., assignors to Bell Telephone Laboratories, Incorporated, New York, N.Y., a corporation of New York Application September 30, 1954, Serial No. 459,300

4 Claims. (Cl. 178—5.6)

This invention relates to two-way communication service and has for its principal object to provide each subscribing party to such service with simultaneous audible and visual impressions originating with the other party. A related object is to provide such two-way sight and sound communication without making undue frequency bandwidth demands on the transmission medium.

The world wide development of excellent telephony, i.e., two-way voice communication, which has taken place during the past half century has been rendered possible by the steadfast adherence, on the part of those responsible for the development, to two goals: the determination of the necessary and sufficient frequency band for a telephone channel, and standardization of equipment and techniques in a fashion to provide every subscriber with this standard band. As a consequence of this development, the world, and especially the Territory of the United States of America, is covered with a network of telephone lines, each having a bandwidth of approximately 4,000 cycles per second. This necessary and sufficient bandwidth of 4,000 cycles per second represents a judicious compromise between considerations of naturalness of voice reproduction on the one hand which makes for greater bandwidth and greater cost, and provision for the continued growth and expansion of the telephone system, which dictates the reduction of bandwidth. The development has also been greatly facilitated by the acceptance of low power levels: sufficient to actuate a transducer which is held to the ear, and no more.

By contrast, the art of vision signal transmission has developed along other lines, represented by two divergent tendencies. On the one hand, television has aimed at supplying each receiver with pictures of large size, suitable for simultaneous viewing by a number of persons and in a great amount of detail, represented by wide variations of contrast in the picture, both from point to point at the same time, and from time to time at the same point. These aims can only be attained at the price of very great frequency bandwidth in the transmission medium; so great, indeed that such facilities are out of the question, economically, for a private subscriber, and can be tolerated only by those who simultaneously reach a large number of receivers; i.e., by broadcasters. In other words, television is essentially a one-way communication medium.

The other tendency, typified by the facsimile art, is to force vision signals through narrow band transmission channels without sacrifice of the point to point detail. This can be done only at the price of a heavy sacrifice of the time to time detail. Thus the transmission of a picture by facsimile techniques may occupy many minutes. It may even be still in process and not completed when the need for it is past. From the communication standpoint, facsimile is thus comparable with telegraphy; i.e., delivery of the message concurrently with the request for such delivery is impossible.

It is obviously desirable that an ordinary two-way voice communication be supplemented by some sort of two-way vision signal communication. The slow transmission speed of facsimile and the wide frequency band of television place these techniques beyond consideration.

The present invention takes as its starting point the view that the value to the subscribers of any such vision signal supplement to their voice communication is roughly equal to the value of the voice communication itself. It takes bandwidth as the best single measure of the price at which such value is purchased and accordingly allots a single entire 4,000 cycle per second bandwidth telephone channel to such vision signal. Having established this bandwidth restriction it then sets out to furnish each subscriber, concurrently with the voice of his opposite party, with a picture of his opposite party too, and to establish, within the restrictions imposed by this bandwidth limitation, an optimum compromise between the various considerations which require bandwidth for their transmission, namely picture size, picture contrast variations, and rapidity of picture change.

A picture having the form of a square whose dimensions are one inch by one inch contains about 3,600 picture elements which are at the threshold of resolution of the unaided eye at the distance of most distinct vision. It has been found that such a picture contains an amount of detail which is necessary and sufficient as a voice telephone supplement. It has also been found that the transmission of a fresh picture of this character once each second, which requires, in principle, a band of nominal width 1,800 cycles per second, creates in the viewer a highly satisfactory impression of the viewed party and his movements.

The satisfying character of this impression is in large measure due to the fact that the time through which each picture endures, before giving place to the next one, is longer than the visual retention time of the eye, so that the impression of flicker is avoided, and shorter than the neutral retentivity of the brain so that an impression of continuity from each picture to the next is achieved. The selection of this period determines the picture change rate. This rate, together with the available channel bandwidth determines the number of distinct "elements" which make up the picture; and the holding of these elements at or below the threshold of resolution of the eye determines the size of the picture.

Accordingly the invention provides transmission, from each subscribing party to the other, and over a standard 4,000 cycles per second telephone channel, of pictures of this character, and at this rate.

To actualize such two-way sight and sound communication, the invention provides each telephone subscriber, in addition to his telephone set which may be conventional, with a scene pickup device, e.g., a miniature camera tube, and an image forming device, e.g., a miniature picture reproducing tube. These devices are preferably mounted close together and on axes which converge at an intersection point somewhat beyond the distance (ten inches, approximately, for the unaided eye) of most distinct vision, measured from their faces, i.e., at a distance of 20–40 inches. The camera tube generates image signals of whatever scene is within its field of view, in the customary way, and at a rate of, for example, 20 frames per second. A record is made of the vision signals of only one of these frames, the remaining nineteen being discarded. This record is scanned at slow speed, to produce modified vision signals, compressed on the frequency scale and expanded on the time scale by a factor of 20:1. The modified signals are transmitted over a standard telephone channel, whose bandwith is sufficient for the purpose, to a receiver station, where they are recorded at the relatively slow rate at which they arrive. The resulting record is now scanned twenty times in succession and at a high speed;

higher, in the ratio of 20:1 than the recording speed, to recover a vision signal representing the one undiscarded frame, and restored to its original dimensions in frequency and time. This vision signal is applied twenty successive times to the receiving subscriber's reproducer tube to produce on its face twenty successive repetitions of the undiscarded frame. At the end of one second, these operations are repeated for the fortieth frame, the intervening ones being discarded as before, and so on. The receiving subscriber is thus presented with a sequence of physically still pictures, each of which endures for one second and then gives place abruptly to the next. The impression made on the receiving subscriber is one of flickerless, undelayed picture transmission which is concurrent with, and supplements, his voice transmission, while the picture rate of change is such as to create the illusion of almost continuous change in the scene being viewed.

In an ordinary telephone conversation, each party may at any time if he wishes, hear without being heard, as when he wishes to speak to a visitor, merely covering his telephone transmitter with his hand to prevent his voice waves from striking its diaphragm. The present invention provides a visual counterpart to this operation, enabling one subscriber to see a picture of the other without himself being seen. This is accomplished by the relative disposition of the pickup device and the reproducer device and by the provision and arrangement of an adjustable eyeguide with respect to them in a fashion such that the subscriber may either view the received picture as it appears on the face of the reproducer tube through the guide, in which event his face is within the field of the camera tube, or he may view it around the guide, in which event his face is concealed from the camera tube. Each subscriber may adjust his own eyeguide to suit his own preferences.

The invention will be fully comprehended from the following detailed description of a preferred illustrative embodiment thereof taken in connection with the single appended drawing.

Referring to the drawing which shows, in block schematic form, a complete system embodying the invention, West subscriber 1 and an East subscriber 1′ are shown engaged in two-way sight and sound communication. while in practice each of them is to be provided with transmitting apparatus and receiving apparatus, the drawing shows the West subscriber's transmitting apparatus and the East subscriber's receiving apparatus. Duplication of the receiver apparatus in the West substation and of the transmitter apparatus at the East substation presents no problem, but to show such duplication would tend unduly to complicate the drawing.

Each subscriber is provided with a conventional telephone set 2, 2′, including a transmitter and a receiver. Associated telephone apparatus and lines, which may be conventional, are not shown. In the description to follow, receiver apparatus elements shown at the East station, that are the same as the West station sending apparatus elements, are denoted by like reference characters, distinguished by primes.

Each subscriber is provided, further, with a supplementary vision signal set which may comprise a miniature camera tube 4 and a miniature reproducer tube 5, together with associated apparatus for controlling the intensity and the vertical and horizontal sweeps of the cathode beams of these tubes. The tubes 4, 5 may be mounted in a cabinet 6 having a front face arranged at an angle for the convenience of the subscriber 1, and they are preferably mounted therein with their faces not more than a few inches apart and at an angle to each other such that their central axes intersect at the distance of greatest subscriber convenience, which is normally about two to four times the distance of the most distinct vision. For the unaided human eye, the distance of most distinct vision is about ten inches. An adjustable eyeguide 7 is preferably provided, extending from the face of the cabinet 6, in front of the reproducer tube 5.

A wave to control the vertical sweeps of the cathode beams is applied to the beam sweeping apparatus within the cabinet from a vertical sweep generator 8, and similarly a wave to control the horizontal sweeps of the cathode beams is derived from a horizontal sweep generator 9 and similarly applied. The vertical sweep generator 8 is tripped by the passage of a single tooth extending from the periphery of a metallic disc 11 past the gap in a magnetic pickup head 12. Similarly each horizontal sweep is initiated by the passage of one of the 60 teeth of another metallic disc 13 past the gap in a magnetic pickup head 14. These two discs 11, 13 are synchronously driven from the shaft 15 by a common mechanical energy source such as a synchronous motor 16. The speed of this motor 16 may be adjusted so that each of these discs 11, 13 makes twenty revolutions per second. With this arrangement the cathode beams in the camera and reproducer tubes scan the tube faces completely, twenty times each second, each scan comprising sixty lateral sweeps. In accordance with the well known principles and techniques of television, these operations give rise on the output conductor 17 of the camera tube 4 to conventional vision signals, twenty frames per second.

In accordance with the present invention these vision signals are applied to one terminal of a switch 20 which is momentarily closed, once during each second, for a period of $\frac{1}{20}$ second. This operation may be carried out in any desired fashion but for the sake of best illustrating the principles of the invention the drawing shows a cam 21 having a peripheral riser 22 occupying one twentieth of its circumference. The cam is rotated at one revolution per second by gearing 23 which steps down the speed of the output shaft 15 of the synchronous motor 16 in the ratio of 20:1. Thus, once in each second the cam riser 22 urges the movable contact of the switch 20 against the fixed contact and holds it there for precisely $\frac{1}{20}$ second, thereupon opening the circuit which remains open thereafter for $\frac{19}{20}$ second.

A record-sensitive element, here illustrated as a magnetizable tape 25 is driven at a steady linear speed by a driver roller 26, against which the tape is urged by an idler roller 27. The driver roller 26 is fixed to a gear 28 which is rotated at one revolution per second through step down gearing 29 in the ratio of 20:1 from the shaft 15 of the synchronous motor 16. The tape 25 is led by a guide 31 around a nearly circular loop 32 of preassigned length. Mounted in the center of this loop is a magnetic recording head 33 which is directly coupled to the synchronous motor shaft 15 and so rotates at twenty revolutions per second. A magnetic pickup head 34 is mounted adjacent to a convenient portion of the tape 25. Thus the tape 25 passes the pickup head 34 at the lineal speed of the periphery of the driver roller 26, while the speed of the relative movement of the recording head 33 and the tape 25 is much greater, e.g., precisely twenty times as great. This speed ratio may be precisely adjusted by the coordination of the radii of the recording loop 32 and of the driver roller 26.

When the apparatus is set up, care should be exercised to adjust the gears, the pulse-starting discs 11, 13 and the recorder head 33 in a fashion such that desired phase relations are preserved. Thus, for example, the high sector 22 of the cam 21 should have just closed the contacts 20 at the instant in which vertical and horizontal sweeps of the cathode beams have just commenced for one frame, and at the same moment the magnetic recorder head 33 should have just commenced one of its sweeps around the recording loop 32. With this arrangement, closure of the switch 20 operates to select the vision signals of precisely one frame of the scene within the field of view of the camera tube 4, while opening of the switch operates to discard the next nineteen such frames.

With this arrangement the vision signals of a single frame are recorded at comparatively high speed by the recorder head 33 on the recording loop 32 of the magnetic tape 25. The tape continues its steady advance at a much slower rate past the pickup head 34 which generates modified vision signals corresponding to those of the selected frame but expanded on the time scale and compressed on the frequency scale as compared with the original vision signals in a ratio of 20:1. These modified vision signals are now transmitted over a standard telephone line or channel 45 of 4,000 cycles per second bandwidth. The transmission may be carried out by conventional single side band or vestigial side band techniques, for which the bandwidth of the standard channel is ample. To this end a carrier generator 36 and a vestigial side band modulator 37 are shown. The selected frame signals recorded on the tape 25 are erased, before the tape returns to the recording loop 32, by means of an erase head 18 mounted adjacent to a convenient portion of the tape 25 and energized, for example, by a source of high frequency energy 19.

That the modified vision signal occupies no more bandwidth than that of a standard telephone channel will be plain upon recognition that a picture comprising sixty lines, each having sixty picture elements, or a total of 3,600 picture elements, compares favorably, in respect to its quality and detail, with a half-tone reproduction in a magazine or a newspaper, provided only that it be restricted in size. Thus if 3,600 picture elements are distributed over a square picture whose dimensions are one inch by one inch, the picture elements are not individually visible to the unaided eye. By spreading the transmission of these picture elements of a single frame over the entire period of a single second of time the desired transmission can in principle be carried out within a band of 1,800 cycles per second. Thus the provision of a conventional standard telephone channel of 4,000 cycles per second bandwidth, whose phase and amplitude characteristics are suitable at least over the central 2,000 cycle part of its band, is ample for a one inch square picture; indeed, it provides a margin of safety.

To the vision signal record thus formed at the West station there may be added a record of the horizontal and vertical synchronizing signals derived as described above. To this end these signals, in addition to being applied to the camera and reproducer tubes at the West station are applied by way of buffer amplifiers 41, 42 through a manual switch 43 to the recorder switch 20.

The entire vision signal, modified in the fashion described above, is transmitted over a standard telephone channel 45 to an East substation where, in effect, the foregoing operations are reversed. After removal of the carrier in conventional fashion by a demodulator 50 to which is applied a carrier from a source 51 that part of the modified vision signal which corresponds to a single undiscarded frame of the scene at the West substation is first recorded at the speed at which it arrives and without further modification. When the recording is complete, signals are repeatedly recovered from the record at high speed, and these repeatedly derived signals are applied to a reproducer tube to reconstruct this frame. While the reproduction of this frame is proceeding in this fashion the next undiscarded frame is being recorded for similar subsequent reproduction, and so on. To carry out this process requires the provision of two recording heads, two sensitive media on which the records are made, and two reproducer heads which operate turn and turn about.

Coming now to the details of the apparatus which carries out these operations, the East subscriber 1' is provided with a conventional telephone instrument 2', a cabinet 6' containing a camera tube 4' and a reproducer tube 5' and supplied with vertical and horizontal synchronizing pulses from generators 8', 9'. The East station may utilize a one-tooth disc 11' and a sixty-tooth disc 13' which are driven in common from a synchronous motor 16', as described for the West station, for controlling synchronism of the beam-sweeping operations. The East station is provided with two endless bands 53, 54 of magnetic recording tape, each of which may be similar to the tape 25 at the West station. Each of these tapes is provided with a fixed magnetic head 55, 56 and a moving magnetic head 57, 58 which rotates within a loop 59, 60 formed by a guide 61, 62. These tapes 53, 54 are arranged to be driven in alternation, each for a period of one second, while the other remains stationary. This alternation is controlled by a cam 65 having a first high sector 66 and a second low sector 67 each extending through 180 degrees. The cam 65 is driven by the synchronous motor 16' through gearing 68 having a 40:1 step down ratio. As in the case of the West apparatus the pulsing discs 11', 13' and the moving heads 57, 58 must initially be phased for proper operation as they are coupled to the synchronous motor 16'. In addition, the cam 65 must likewise be so phased; i.e., it must be at the point of raising its follower to the high sector 66 or of dropping it to the low sector 67 at the commencement of the undiscarded frame.

This cam 65 controls a number of switches 70. The operation of these switches will be described when they and the cam 65 which controls them are in the position shown. Thus the first back contact is open. Accordingly, a solenoid 71 which actuates an idler roller 72 is unenergized, and the tape 53 remains stationary. On the other hand the second back contact is closed and this completes the circuit of a battery, not shown, with its positive terminal connected to one end of a solenoid winding 74 and its negative terminal to the other end of this winding. Accordingly, the solenoid 74 is energized and urges an idler roller 75 into contact with the tape 54 whereupon the tape is driven by its driver roller 78 at the same lineal speed as the West station tape 25. Thus, at the indicated epoch, the upper tape 53 is stationary while the lower tape 54 is advancing.

The third contact connected to the upper fixed head 55 is open. The fourth contact, connected to the lower fixed head 56 is closed against the second movable contact of the switch 70 which carries the incoming modified vision signal. Accordingly, this modified vision signal is recorded on the lower moving tape 54 of the East station at slow speed.

The fifth fixed contact of the switch 70 connected to the lower rotating head 58 is open, while the sixth fixed contact connected to the upper rotating head 57 is in contact with the third movable contact, thus to establish a path from the upper rotating head 57 to the East subscriber's reproducer tube 5'. Thus the upper rotating head 57 traveling past the upper tape loop 59 at a lineal speed twenty times as great as the lineal speed of recording; i.e., the lineal speed with which tape 53 advances when its solenoid 71 is energized, picks up the modified vision signal which was last recorded on the upper tape 53, introducing a second modification of its characteristics as it does so. This second modification is a compression on the time scale and an expansion on the frequency scale in the ratio of 20:1; i.e., the exact opposite of the modification of the original signal which was carried out as described above at the West station. Inasmuch as these modifications are mutually complementary, the vision signal picked up by the upper rotating head 57 thus twice modified, is restored to its original character. Its waveform is the same as that originally delivered by the West subscriber's camera tube 4, and represents the single undiscarded frame of the West substation scene.

In accordance with the invention this vision signal is repeatedly applied to the East subscriber's reproducer tube 5'. The first application consumes $\frac{1}{20}$ second. It is immediately followed, in the next $\frac{1}{20}$ second, by a second application, due to a second passage of the rotating pickup head 57 around the same loop 59 of the tape 53 which, because the solenoid 71 is not energized, has not moved in the interim. In accordance with the invention the same vision signals are re-applied to the East substation reproducer tube twenty times in succession without change. These operations require a full second. During the passage of this second the next frame selected at the West substation has been picked up at slow speed by the pickup head 34 transmitted over the telephone channel 45 to the East substation and there, because the cam 65 has rotated through 180 degrees, has been recorded at the same low speed on the lower tape 54. When this second of time has fully elapsed, the recording is complete, the cam 65 shifts the contacts 70, the movement of the lower tape 54 is arrested and the lower pickup head 58 proceeds to scan the fixed loop 60 at high speed, twenty successive times to deliver to the reproducer tube 5' twenty successive repetitions of the vision signals derived from the second selected frame at the West substation. Erase heads 18' and **18*a*' energized, for example, by source 19', are mounted adjacent to convenient portions of the tapes 53 and 54**, respectively, to erase the modified vision signals previously recorded thereon after they have been read out twenty successive times and before subsequent selected frame signals are recorded on the tapes.

If the manual switch 43 at the West substation is closed the transmitted signal contains synchronizing pulses. These are recorded, along with the vision signals, on the two East substation tapes 53, 54 in alternation and are picked up by the rotating heads 57, 58 in similar alternation and applied to the conductor 80. They are selected by appropriate sync separators 81, 82 and applied by way of manual switches 83, 84 to the vertical and horizontal synchronizing pulse generators 8', 9', respectively. These generators, tripped by the incoming synchronizing pulses, cause the cathode beams of the two East substation tubes 4', 5' to sweep their faces in synchronism with the beams of the West substation tubes 4, 5. Provided it be preferred always to include synchronizing pulses in the transmitted signals the pulsing discs 11', 13' and pickup heads 12', 14' may be dispensed with.

To bring the entire set of East end operations into phase with the entire set of West end operations, provision is made for adjusting the phase of the angle of the output shaft 15' of the synchronous motor 16' into proper relation with the corresponding angular position of the output shaft 15 of the West substation synchronous motor 16. This phasing may be carried out in any desired fashion, an adjustable phase shifter 85 being schematically shown for the purpose.

In accordance with an ancillary feature of the invention, each subscriber 1, 1' is provided with an eyeguide 7, 7' comprising a loop of adjustable diameter mounted in front of the face of the reproducer tube 5, 5' and at an adjustable distance therefrom. It may be arranged, by each subscriber in terms of his own preferences, in a fashion such that it marks a boundary of the field of view of the camera tube 4, 4' in terms of the angle from which the reproducer tube 5, 5' is viewed by the subscriber. That is to say, it is mounted in a location such that the subscriber 1, 1' may conveniently view the reproducer tube 5, 5' through the loop of his eyeguide 7, 7' in which case his head is centered in the field of view of the camera tube 4, 4'. He may, however, if he preferred to see his opposite party without being seen, merely move to one side and view the reproducer tube 5, 5' aslant, in which case he has removed his head from the field of view of the camera tube.

What is claimed is:

1. A two-way communication system including a first and a second substation, telephone means at each substation for two-way telephone service and picture communication means at each substation for providing subscribers using said telephone means with a visual impression of each other, said picture communication means comprising transmission means at said first station and receiving means at said second station and a transmission link having a bandwidth of approximately 4000 cycles per second interconnecting said transmission and receiving means, said transmission means comprising a miniature camera for generating vision signals at a rate of 20 frames per second, said camera including horizontal and vertical sweep generating means, means for selecting one frame of each succession of 20 generated frames and for rejecting 19 of the remaining frames of said succession, a continuous length of magnetizable tape, means for recording the selected frame of each of said successions at a rate of 20 frames per second on said tape, said recording means comprising an arcuate guide which is contacted by a relatively short section of said tape, a recording head rotatably mounted within the arc of said guide and operatively associated with said tape, means for rotating said recording head, means for advancing said tape along said guide at a uniform rate, a pickup head fixedly mounted in operative association with said tape at a point external to the arc of said guide, the relative movement between said recording head and tape being 20 times greater than the relative movement between said tape and said fixed pickup head, means for erasing signals recorded on said tape subsequent to the passage of said tape past said pickup head, common closely coupled means for synchronously operating said sweep generating means, said frame selecting means, said tape advancing means and said recording head rotating means to insure close adherence to a preassigned phase relationship between the speed and instants of operation of said synchronously operated means, means including said transmission link for transmitting signals picked up by said pickup head to said receiving means, and said receiving means comprising means for recording signals received from said transmission means, said last-named recording means comprising two continuous lengths of magnetizable tape each mounted to traverse an associated arcuate guide, a pair of fixedly mounted recording heads each operatively associated with one of said tapes at a point removed from its associated guide, means for alternately advancing said tapes past their respective recording heads at an advancing speed of one frame per second, successive advances of each tape being separated by a dwell of said each tape in place, each advance and each dwell time occupying 20 successive frame periods, pickup means comprising a pair of magnetic pickup heads each rotatably mounted within the arc of one of said guides and operatively associated with the tape traversing its associated guide, means for rotating said heads at a rate relative to the advance of its associated tape of 20 frames per second, means for erasing recorded signals subsequent to pick up, an image reproducer, switching means for connecting the pickup head associated with an advancing tape to said reproducer device and for disconnecting the pickup head associated with a dwelling-in-place tape from said reproducer device whereby frames recorded on said tapes are each applied 20 times in succession to said image reproducer, and common closely coupled means for synchronously operating said tape advancing means, said pickup head rotating means, and said switching means thereby to insure close adherence to a preassigned phase relationship between the speed and instants of operation of said synchronously operated means, and phase adjusting means for establishing a desired relationship between the operation of the synchronously operated transmission means and the synchronously operated receiving means.

2. Apparatus as defined in claim 1 wherein each substation is provided both with a miniature camera device and with a reproducer device, said camera device and said reproducer device being disposed in mutual proximity with their axes intersecting in a point located at a distance in front of the faces of said camera device and said reproducer device, and an adjustable eyeguide located on the axis of said reproducer device, at a point between the face of said reproducer device and said point of intersection, said eyeguide comprising a thin adjustable annulus mounted in a plane transverse to the axis of the reproducer device by means of a rod of adjustable length extending substantially parallel to the axis of said reproducer device for defining a relatively narrow range of location within which an observer must locate himself to come within the field of view of said camera device and outside of which his view of the reproducer device is substantially unimpeded, whereby a line of sight from the face of the reproducer device extends through said annulus to the eye of the subscriber whose eyes are located at or near said intersection point and passes externally to said annulus to the eye of a subscriber whose eyes are located at any other position.

3. Apparatus as defined in claim 1 wherein said common closely coupled means associated with said transmission means comprises a motor, a shaft rotatably driven by said motor, a single tooth cam mounted on said shaft, a magnetic pickup head operatively associated with said single tooth cam for generating once in each rotation of said shaft a single pulse for energizing said vertical sweep generating means, a 60-tooth cam mounted on said shaft, a magnetic pickup head operatively associated with said 60-tooth cam for generating once in each rotation of said shaft 60 pulses for energizing said horizontal sweep generating means, a speed reducing mechanism operatively associated with said shaft including a single tooth cam energizing said frame selecting means, a speed reducing mechanism operatively associated with said shaft for driving a roller at a uniform rate for advancing said tape, and a lever arm fixedly mounted on said shaft for rotating said recording head.

4. Apparatus as defined in claim 1, wherein said common closely coupled means associated with said receiving means comprises a motor, a shaft rotatably driven by said motor, a pair of speed reducing mechanisms operatively associated with said shaft for driving, respectively, a pair of rollers for advancing said tapes, a speed reducing mechanism operatively associated with said shaft including a cam for operating said switching means, and a pair of lever arms each fixedly mounted on said shaft for supporting and driving one of said magnetic pickup heads, and wherein said phase adjusting means comprises means for adjusting the relative phase of said motor with respect to a preassigned phase condition.

References Cited in the file of this patent

UNITED STATES PATENTS

| | | |
|---|---|---|
| 1,735,037 | Carpe | Nov. 12, 1929 |
| 1,805,594 | Parker | May 19, 1931 |
| 1,835,031 | Espenschied | Dec. 8, 1931 |
| 1,932,253 | Ives | Oct. 24, 1933 |
| 2,099,115 | Ives | Nov. 16, 1937 |
| 2,250,476 | Evans | July 29, 1941 |
| 2,281,405 | Barrish | Apr. 28, 1942 |
| 2,306,435 | Graham | Dec. 29, 1942 |
| 2,314,471 | Wright | Mar. 23, 1943 |
| 2,388,170 | McCollum | Oct. 30, 1945 |
| 2,420,198 | Rosenthal | May 6, 1947 |
| 2,478,545 | Pearce | Aug. 9, 1949 |
| 2,764,148 | Sheldon | Sept. 25, 1956 |
| 2,786,887 | De France | Mar. 26, 1957 |

FOREIGN PATENTS

| | | |
|---|---|---|
| 694,005 | Great Britain | July 8, 1953 |